United States Patent
Schaevitz et al.

(10) Patent No.: US 10,608,474 B2
(45) Date of Patent: Mar. 31, 2020

(54) WIRELESS POWER SYSTEM WITH POWER MANAGEMENT

(71) Applicant: Apple Inc., Cupertino, CA (US)

(72) Inventors: Samuel B. Schaevitz, Los Gatos, CA (US); Cortland S. Tolva, Redwood City, CA (US); James R. Walker, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 15/881,336

(22) Filed: Jan. 26, 2018

(65) Prior Publication Data

US 2019/0067995 A1 Feb. 28, 2019

Related U.S. Application Data

(60) Provisional application No. 62/552,990, filed on Aug. 31, 2017.

(51) Int. Cl.

| | |
|---|---|
| *H02J 50/12* | (2016.01) |
| *H02J 50/80* | (2016.01) |
| *H02J 7/02* | (2016.01) |
| *H04B 5/00* | (2006.01) |
| *H02J 50/40* | (2016.01) |
| *H01Q 1/24* | (2006.01) |
| *H04L 27/06* | (2006.01) |
| *H04L 27/14* | (2006.01) |

(52) U.S. Cl.
CPC ............. *H02J 50/12* (2016.02); *H02J 7/025* (2013.01); *H02J 50/40* (2016.02); *H02J 50/80* (2016.02); *H04B 5/00* (2013.01); *H04B 5/0037* (2013.01); *H04B 5/0081* (2013.01); *H01Q 1/248* (2013.01); *H04L 27/06* (2013.01); *H04L 27/14* (2013.01)

(58) Field of Classification Search
CPC ............ H02J 50/12; H02J 50/80; H04L 27/06
See application file for complete search history.

(56) References Cited

U.S. PATENT DOCUMENTS

| | | |
|---|---|---|
| 9,209,627 B2 | 12/2015 | Baarman et al. |
| 9,559,526 B2 | 1/2017 | Von Novak, III et al. |
| 2015/0207333 A1* | 7/2015 | Baarman ................. H02J 5/005 307/104 |

(Continued)

*Primary Examiner* — Alfonso Perez Borroto
*Assistant Examiner* — Esayas G Yeshaw
(74) *Attorney, Agent, or Firm* — Treyz Law Group; George Victor Treyz; Jason Tsai

(57) ABSTRACT

A wireless power receiving device may have wireless power receiving circuitry with a coil and rectifier. The wireless power receiving circuitry receives wireless power signals and uses the rectifier to supply a corresponding output. The output is characterized by a current, a voltage, and a power equal to a product of the current and voltage. The output of the rectifier is supplied to a direct-current-to-direct-current power regulator integrated circuit, which supplies direct-current power to a system load and battery. A controller integrated circuit directs the power regulator circuit to dither the current while monitoring for a peak in the power. If the power regulator circuit dithers the current satisfactorily, the wireless power receiving circuitry may be operated at the peak power. If the power regulator circuitry does not dither the current in response to being directed to dither the current, a wireless power transmission level may be reduced.

20 Claims, 7 Drawing Sheets

(56) References Cited

U.S. PATENT DOCUMENTS

| | | |
|---|---|---|
| 2015/0364927 A1* | 12/2015 | Yu .......................... H02J 50/12 |
| | | 307/104 |
| 2016/0276840 A1 | 9/2016 | Oto |
| 2017/0020643 A1 | 1/2017 | McLean et al. |
| 2017/0040843 A1 | 2/2017 | Asanuma et al. |
| 2017/0077753 A1 | 3/2017 | Ting et al. |
| 2017/0117756 A1* | 4/2017 | Muratov ................ H02J 50/60 |

* cited by examiner

WIRELESS POWER SYSTEM WITH POWER MANAGEMENT

This application claims the benefit of provisional patent application No. 62/552,990, filed Aug. 31, 2017, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a receiving coil and rectifier circuitry for receiving wireless alternating-current (AC) power from a coil in the wireless charging mat that is overlapped by the receiving coil. The rectifier converts the received AC power into direct-current (DC) power.

SUMMARY

A wireless power system may use a wireless power transmitting device to transmit wireless power to a wireless power receiving device. The wireless power transmitting device may transmit wireless power signals at a wireless power transmission level. Wireless power receiving circuitry in the wireless power receiving device may be used to receive the wireless power signals.

The wireless power receiving circuitry may have a coil and a rectifier. The wireless power receiving circuitry receives the wireless power signals and produces a corresponding current and voltage at the output of the rectifier. The power at the output of the rectifier is equal to the product of the current and the voltage at the output of the rectifier. The voltage at the output of the rectifier is supplied to a direct-current-to-direct-current power regulator integrated circuit, which supplies a corresponding regulated voltage to a system load and battery.

During operation, a controller integrated circuit directs the power regulator circuit to dither the current while monitoring the power to detect a peak in the power. If the power regulator circuit dithers the current satisfactorily, the wireless power receiving circuitry may be operated at the peak power. If the power regulator circuitry does not dither the current in response to being directed to dither the current, the wireless power transmission level may be reduced. For example, the wireless power receiver may send an in-band amplitude-shift-keying request to the wireless power transmitting device that directs the wireless power transmitting device to reduce the wireless power transmission level.

DETAILED DESCRIPTION

A wireless power system has a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device has wireless power transmitting coils arranged under a charging surface. During operation, the wireless power transmitting coils are used to transmit wireless power signals that are received by a wireless power receiving coil in the wireless power receiving device. Wireless power signals are transmitted at a wireless power transmission frequency such as a frequency of about 128 kHz, frequencies in a range between 100 kHz and 200 kHz, or other suitable frequency.

To ensure that the amount of power that is transmitted between the wireless power transmitting device and the wireless power receiving device is satisfactory, power transmission may be regulated dynamically. For example, a wireless power receiving device may periodically send wireless power level adjustment requests to the wireless power transmitting device. These requests may direct the wireless power transmitting device to increase or decrease the amount of wireless power being transmitted. The wireless power receiving device may also make internal adjustments to search for satisfactory operating conditions.

Figure 1:
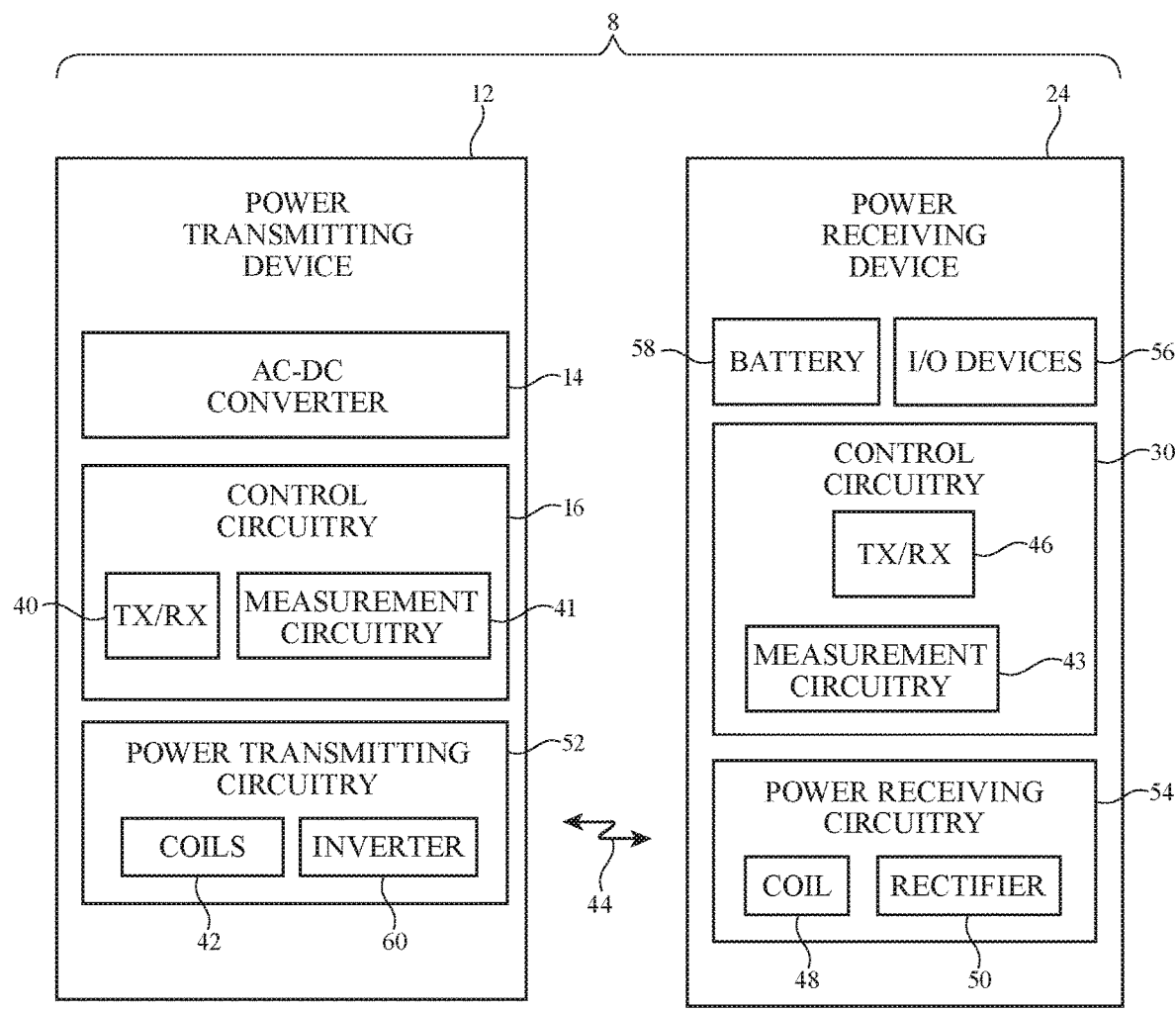
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry includes processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in determining power transmission levels, processing sensor data, processing user input, handling communications between devices 12 and 24 (e.g., sending and receiving in-band and out-of-band data), selecting wireless power transmitting coils, and otherwise controlling the operation of system 8. If desired, control circuitry in system 8 may be used to authorize components to use power and ensure that components do not exceed maximum allowable power consumption levels.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU), digital signal processing circuits, baseband processors, power management units with processing circuitry, microcontrollers, and other processing circuitry.

Power transmitting device 12 may be a stand-alone power adapter (e.g., a wireless charging mat that includes power adapter circuitry), may be a wireless charging mat that receives power from a power adapter or other equipment using a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other electronic equipment. Power transmitting device 12 may receive power from a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off at an alternating-current wireless power transmission frequency based on control signals provided by control circuitry 16. This creates AC current signals through one or more coils 42. Coils 42 may be arranged in a planar coil array (e.g., in configurations in which device 12 is a wireless charging mat).

As AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. In some configurations, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 128 kHz, at least 80 kHz, at least 100 kHz, less than 500 kHz, less than 300 kHz, less than 200 kHz, 100-200 kHz, 50-200 kHz, 100-200 kHz, or other suitable wireless power frequency. In some configurations device 12 varies the power transmission frequency during operation.

In configurations that support FSK in-band communications, wireless transceiver circuitry 40 uses FSK modulation to modulate the power transmission frequency of the driving AC signals that device 12 is using to transmit wireless power and thereby modulates the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In configurations that support ASK in-band communications wireless transceiver circuitry 46 transmits in-band data to device 12 by using a switch (e.g., one or more transistors in transceiver 46 that are connected to coil 48) to modulate the impedance of power receiving circuitry 54 (e.g., coil 48).

This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. Control circuitry 30 has measurement circuitry 43. Measurement circuitry 41 and 43 may be used in making inductance measurements (e.g., measurements of the inductances of coils 42 and 48), input and output voltage measurements (e.g., a rectifier output voltage, and inverter input voltage, etc.), current measurements, capacitance measurements, frequency measurements (e.g., measurements of the frequency of wireless power signals), and/or other measurements on the circuitry of system 8. Illustrative circuitry of the type that may be used for forming power transmitting circuitry 52 and power receiving circuitry 54 of FIG. 1 is shown in FIG. 2.

Figure 2:
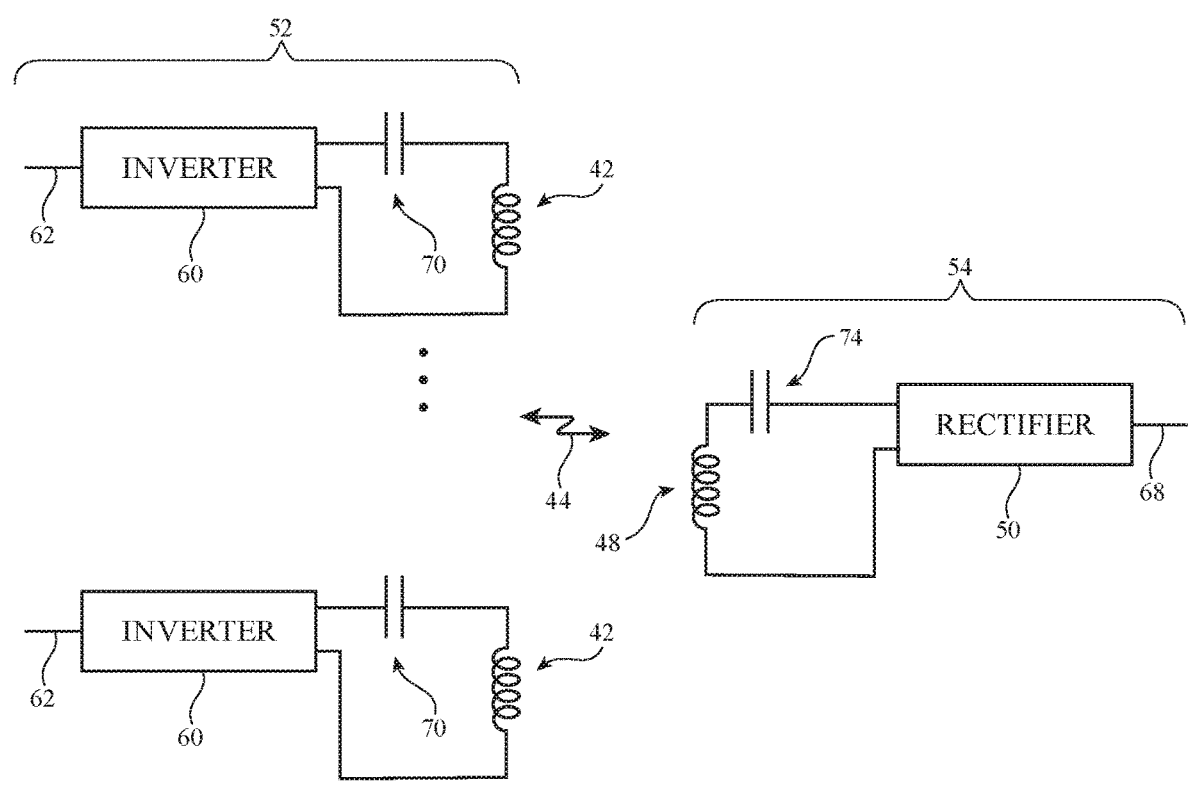
FIG. 2 is a circuit diagram of illustrative wireless power transmitting circuitry and illustrative wireless power receiving circuitry in accordance with an embodiment.

As shown in FIG. 2, power transmitting circuitry 52 may include drive circuitry such as inverters 60 that supply drive signals at the wireless power transmission frequency to respective wireless power transmitter resonant circuits. Each wireless power transmitter resonant circuit may include a wireless power transmitting coil 42 and capacitor 70. Rectifier 50 in wireless power receiving circuitry 54 receives wireless power signals using a wireless power receiver resonant circuit that includes capacitor 74 and wireless power receiving coil 48.

Inverters 60 have metal-oxide-semiconductor transistors or other suitable transistors that are modulated by AC control signals from control circuitry 16 (FIG. 1) that are received on respective control signal inputs 62. The attributes of each AC control signal (e.g., duty cycle, frequency, etc.) may be adjusted by control circuitry 16 dynamically during power transmission to control the amount of power being transmitted by power transmitting coils 42.

When transmitting wireless power, control circuitry 16 (FIG. 1) selects one or more appropriate coils 42 to use in transmitting signals 44 to coil 48 (e.g., control circuitry 16 supplies control signals to the inputs 62 of the inverters 60 that are to drive the selected coils to produce signals 44). Coil 48 and capacitor 74 form a resonant circuit in circuitry 54 that receives signals 44. Receiver 50 rectifies the received signals and provides direct-current output power at output 68.

Figure 3:
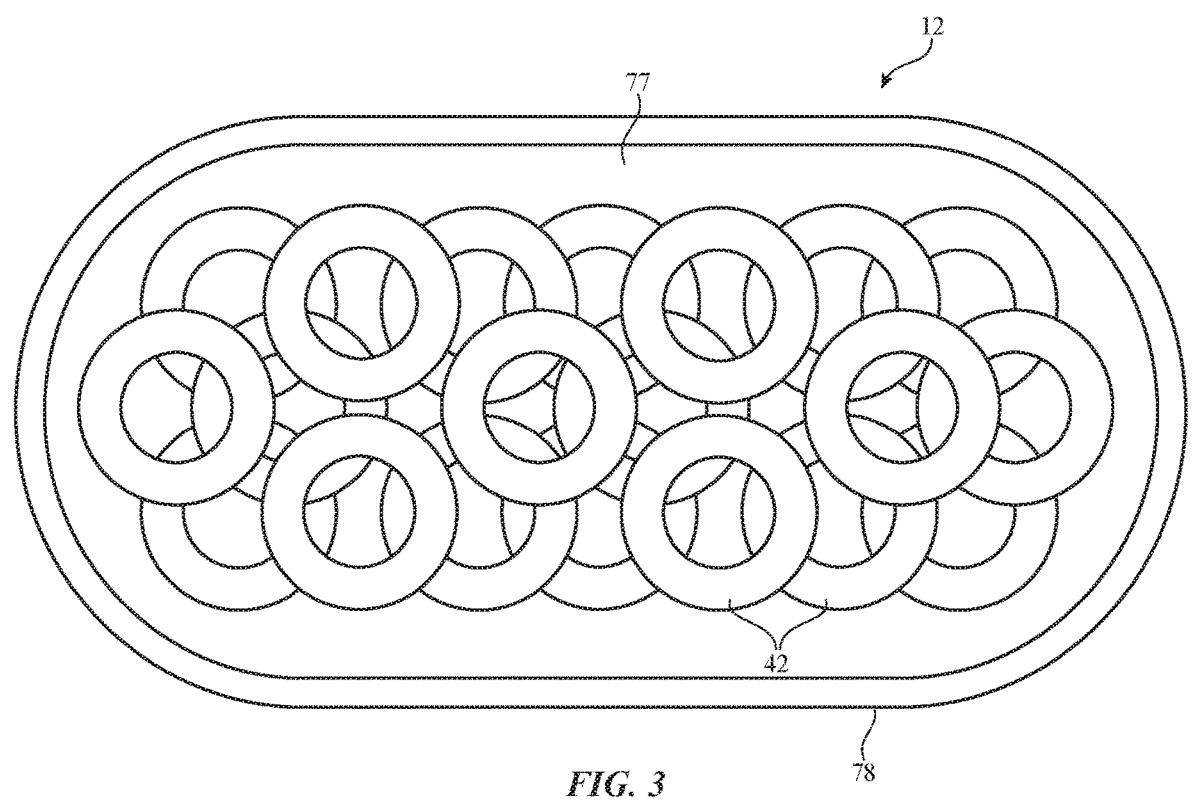
FIG. 3 is a top view of an illustrative wireless power transmitting device in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not partially overlap each other. In the example of FIG. 3, coils 42 partially overlap each other and arranged in three layers.

Device 12 may have a housing 78 (e.g., a housing formed from plastic or other materials) that forms a planar housing surface that covers coils 42 (sometimes referred to as a charging surface). One or more wireless power receiving devices such as device 24 may be positioned on the charging surface to receive wireless power from coils 42. Coils 42 may be circular or may have other suitable shapes (e.g., coils 42 may be square, may have hexagonal shapes, may have other shapes having rotational symmetry, etc.). In the illustrative configuration of FIG. 3, coils 42 are circular and are formed from multiple wire turns (e.g., multiple turns formed from metal traces, bare wire, insulated wire, wire monofilaments, multifilament wire, etc.).

Figure 4:
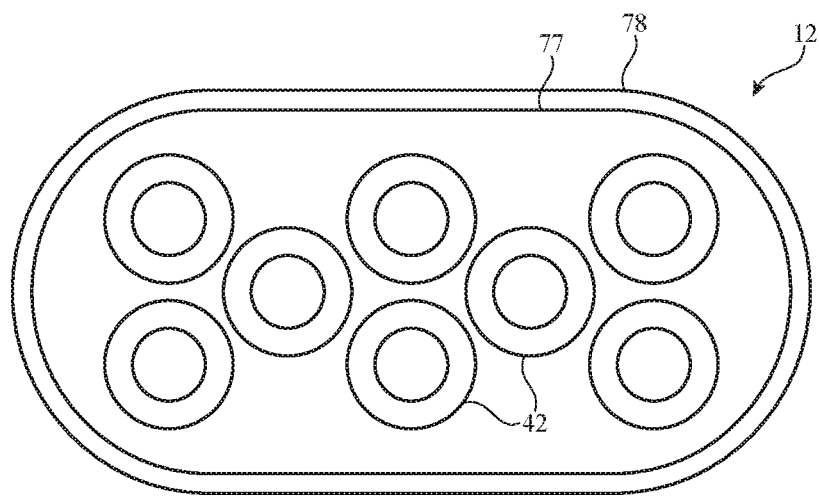
FIG. 4 is a top view of an illustrative lower layer of eight coils for the wireless power transmitting device of FIG. 3 in accordance with an embodiment.
Figure 5:
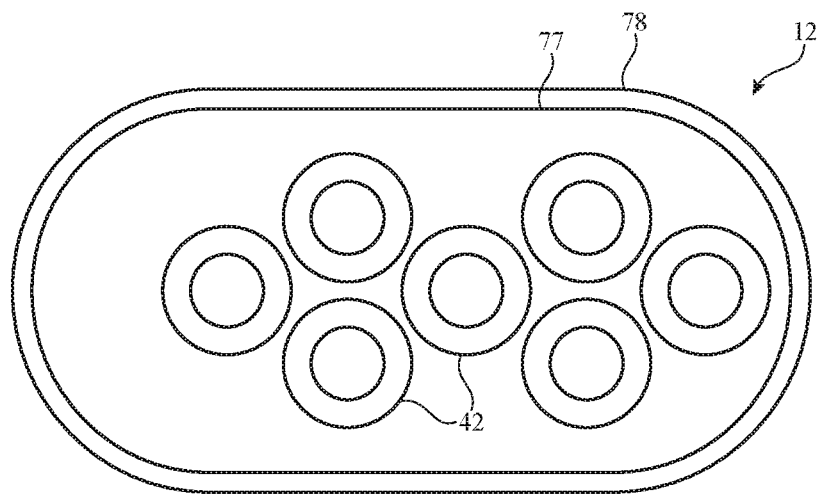
FIG. 5 is a top view of an illustrative middle layer of seven coils for the wireless power transmitting device of FIG. 3 in accordance with an embodiment.
Figure 6:
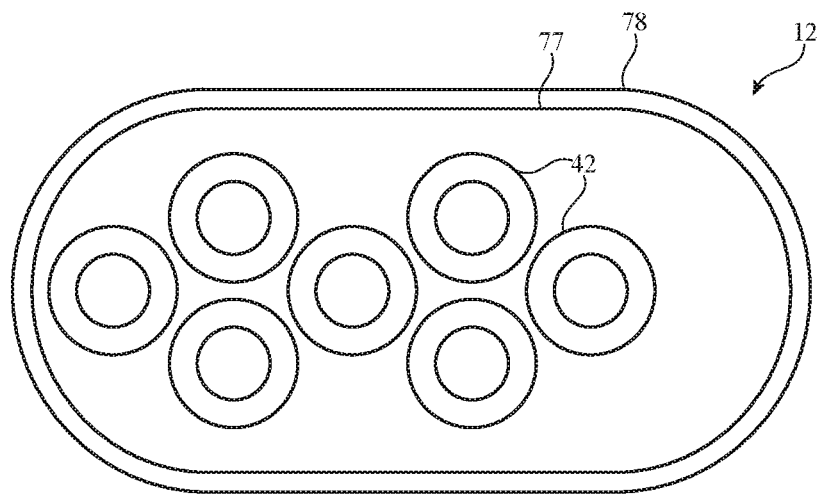
FIG. 6 is a top view of an illustrative upper layer of seven coils for the wireless power transmitting device of FIG. 3 in accordance with an embodiment.

FIGS. 4, 5, and 6 are diagrams of illustrative layers of coils 42 in a wireless power transmitting device such as a charging mat having 22 coils in three layers.

FIG. 4 is a top view of an illustrative configuration for a lower layer 84 having eight coils 42 in wireless power transmitting device 12 of FIG. 3. FIG. 5 is a top view of an illustrative configuration for a middle layer 82 having seven coils 42 for wireless power transmitting device 12 of FIG. 3. FIG. 6 is a top view of an illustrative configuration for an upper layer 80 having seven coils for wireless power transmitting device 12 of FIG. 3. In this example, lower layer 84 has 8 coils, middle layer 82 has 7 coils, and upper layer 80 has 7 coils. In general, each layer may have any suitable number of coils (e.g., at least 2 coils, at least 5 coils, fewer than 9 coils, fewer than 14 coils, 6-9 coils, etc.). Device 12 may have one layer of coils 42, at least two layers of coils 42, at least three layers of coils 42, at least four layers of coils 42, fewer than five layers of coils 42, 4-6 layers of coils, etc. Configurations in which device 12 has only a single coil 42 may also be used.

Figure 7:
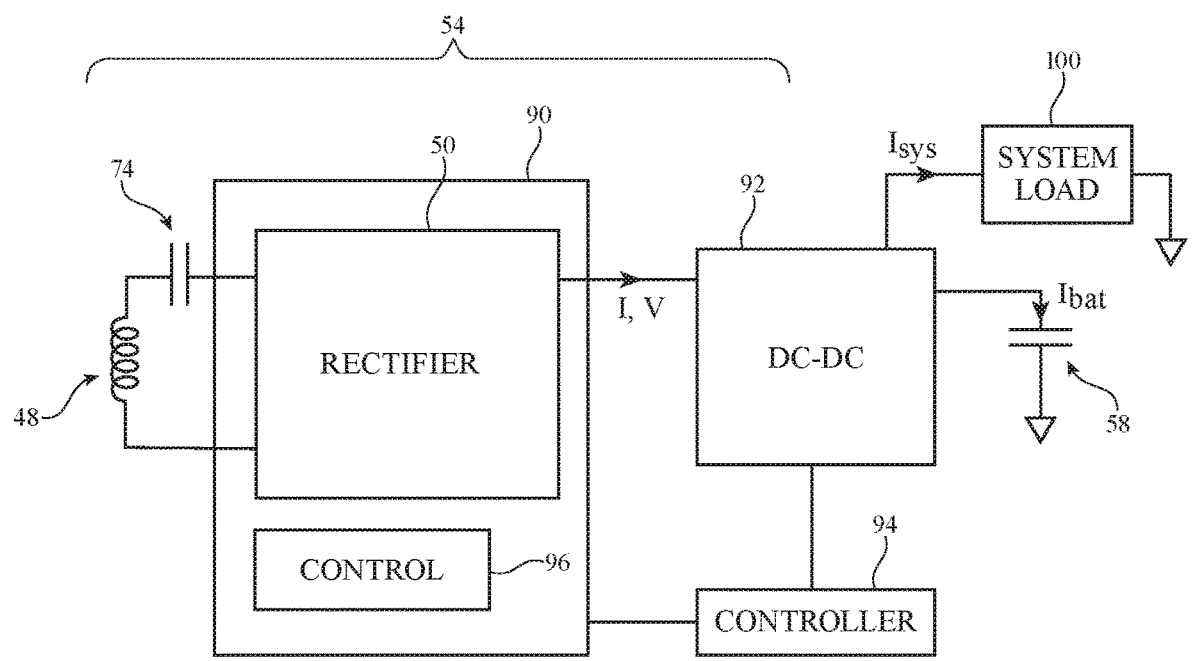
FIG. 7 is a diagram of illustrative circuitry in a wireless power receiving device in accordance with an embodiment.

FIG. 7 is a circuit diagram of illustrative wireless power circuitry for device 24. In the example of FIG. 7, wireless power receiving circuitry 45 includes rectifier circuitry (e.g., rectifier 50) that is implemented in integrated circuit 90. Integrated circuit 90 may also include control circuitry such as control circuit 96 to facilitate communications with other circuitry in device 24. Rectifier 50 of integrated circuit supplies an output to integrated circuit 92. The output is characterized by a current, a voltage, and a power equal to the product of the current and voltage.

During operation, rectifier output current I and rectifier output voltage V are received by integrated circuit 92, which implements a direct-current-to-direct-current (DC-DC) power converter such as a buck converter (sometimes referred to as a voltage regulator or regulator circuit). Regulator integrated circuit 92 receives unregulated voltage V at its input and supplies a regulated voltage output. The output of the DC-DC converter of integrated circuit 92 is supplied to system load 100 (e.g., a display, application processor, sensors, input-output components, communications circuitry, etc.) and is supplied to battery 58 to charge battery 58.

Control circuitry such as controller 94 may be used in controlling the operation of integrated circuits 90 and 92. Controller 94 may be formed using an integrated circuit that is separate from integrated circuits 90 and 92 and/or the circuitry of integrated circuits 90, 92, and/or 94 may be implemented using one integrated circuit, two integrated circuits, or more than three integrated circuits. The example of FIG. 7 is merely illustrative.

During operation, rectifier 50 may receive AC wireless power signals from coil 48 and may supply corresponding DC output power (I, V) to regulator integrated circuit 92. The voltage V may, as an example, range between 4 V and 12 V or other suitable voltage range. The output of regulator integrated circuit 92 may be regulated to 4 V (as an example).

Figure 8:
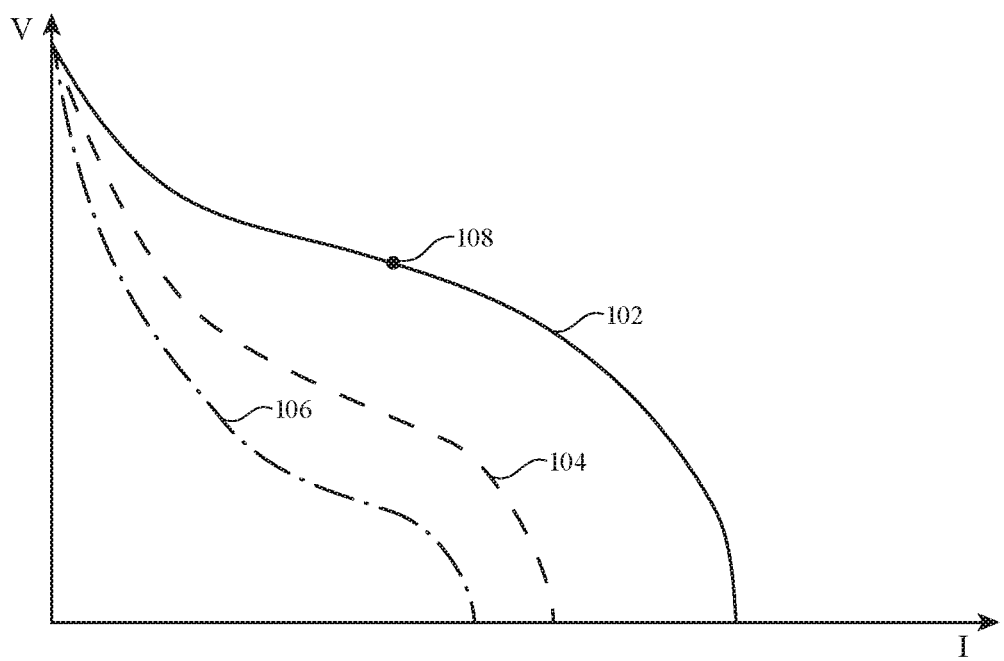
FIG. 8 is a graph of an illustrative voltage versus current characteristic for a wireless charging system in accordance with an embodiment.
Figure 9:
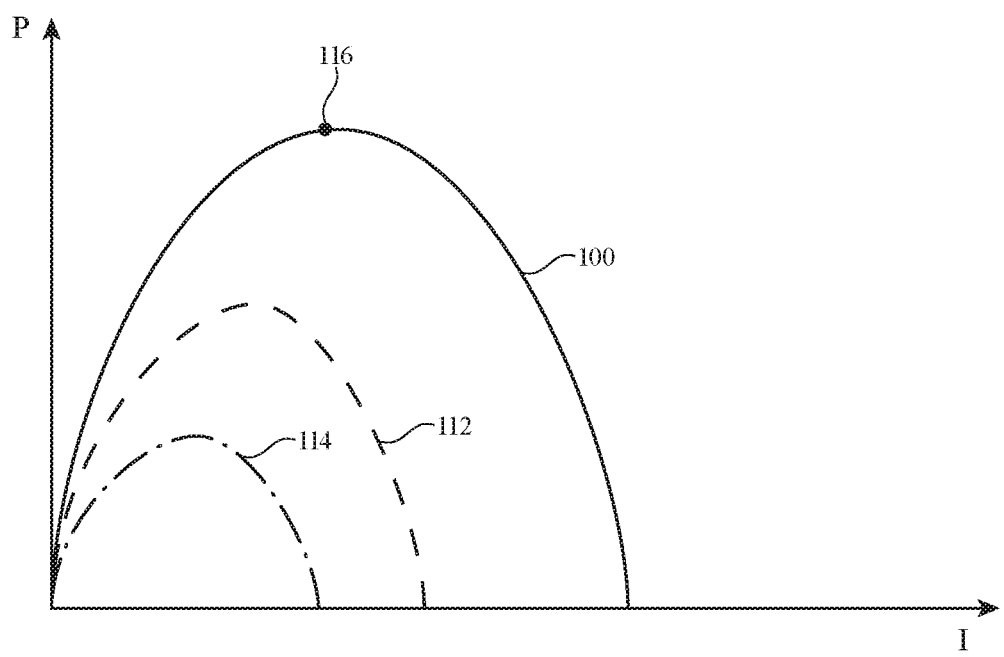
FIG. 9 is a graph of an illustrative power versus current characteristic for a wireless charging system in accordance with an embodiment.

The amount of power delivered by coil 48 and rectifier 50 (e.g., the product of I and V) may vary in accordance with the IV characteristic of FIG. 8 and the power-versus-current characteristic of FIG. 9. Curves 102, 104, and 106 of FIG. 8 represent the IV characteristics of coil 48 and rectifier 50 under various different power delivery scenarios. Curve 102 corresponds to the IV characteristic when wireless power transmitting device 12 is transmitting a first amount of power, curve 104 corresponds to the IV characteristic when wireless power transmitting device 12 is transmitting a second amount of power that is less than the first amount of power, and curve 106 is an illustrative IV characteristic associated with a scenario in which wireless power transmitting device 12 is transmitting a third amount of power that is less than the first and second amounts of power.

Power versus current curve 110 of FIG. 9 corresponds to the IV characteristic and wireless power transmission scenario of curve 102 of FIG. 8, power versus current curve 112 of FIG. 9 corresponds to the IV characteristic and wireless power transmission scenario of curve 104 of FIG. 8, and power versus current curve 114 of FIG. 9 corresponds to the IV characteristic and wireless power transmission scenario of curve 106 of FIG. 8. An illustrative operating point associated with operation of system 8 in a scenario in which device 12 is transmitting the first amount of power is shown by point 108 on curve 102 and point 116 on curve 110.

During operation, device 24 may require varying amounts of power. For example, if battery 58 is uncharged and the temperature of device 24 is low (e.g., room temperature), device 24 may be capable of accepting a first amount of power (e.g., 4.5 W). If, however, battery 58 is at an elevated temperature (e.g., above 35° C. where battery charging is not permitted) and/or battery 58 is full, device 24 may only be capable of accepting a second amount of power (e.g., 2 W) that is less than the first amount of power.

To ensure that an appropriate amount of power is transmitted from device 12 to device 24, device 24 can implement a target power control loop (sometimes referred to as a receiver power loop) in which device 24 periodically uses ASK in-band communications or other suitable wireless communications to send wireless power transmission level adjustment requests to dynamically adjust a target power delivery value (e.g., the amount of wireless power transmitted by device 12 to device 24). These adjustments to the amount of wireless power transmission (e.g., adjustments to a target amount of delivered power Ptarget) may be made dynamically during operation of device 24.

At each different target power level, device 12 may adjust the operation of wireless power transmitting circuitry 52 to ensure that wireless power Ptarget is satisfactorily delivered. For example, if the amount of power delivered is below Ptarget, device 12 can adjust the duty cycle and/or other attributes of the wireless power signal (e.g., wireless power transmission frequency, etc.) being used by circuitry 52 to ensure that the power delivered rises to Ptarget.

To ensure that device 24 is operating efficiently, control circuitry 30 (e.g., controller 94) may adjust integrated circuit (regulator) 92 to adjust the current I while computing the output power P ($P=I*V$) of rectifier 59. Current I may be adjusted by adjusting a current limit value (sometimes referred to as Ilim) associated with the current flowing into integrated circuit 92 from integrated circuit 90. By adjusting integrated circuit 92 so that the current flowing into integrated circuit 92 goes up and down in magnitude (dithering the current), resulting variations in P can be observed and the current associated with the peak (maximum) P value can be identified and used. In this way, device 24 may continually hunt for peak power conditions (operating point 116 of FIG. 9) to enhance efficiency.

Controller 94 can monitor the response of integrated circuit 92 to the commands provided from controller 94 to dither current I. In some circumstances, current dithering operations may fail. For example, integrated circuit 92 may be configured to prevent the value of V from falling below the voltage of battery 58. If an attempted dithering of current I runs against this limit, dithering will fail (e.g., integrated circuit 92 will not dither the current as requested by controller 94 and may, if desired, set a flag bit accordingly within its memory that controller 94 can detect). When a failure of current dithering is detected, device 24 can conclude that excess power is being transmitted from device 12 (e.g., the operating point of device 24 is to the left of illustrative maximum efficiency operating point 116 on curve 110 of FIG. 9), and can therefore send device 12 a request to decrease the wireless power transmission level. This lowers the power-versus-current curve (e.g., to curve 114 of FIG. 9) and allows dithering (and peak power searching) to resume.

Figure 10:
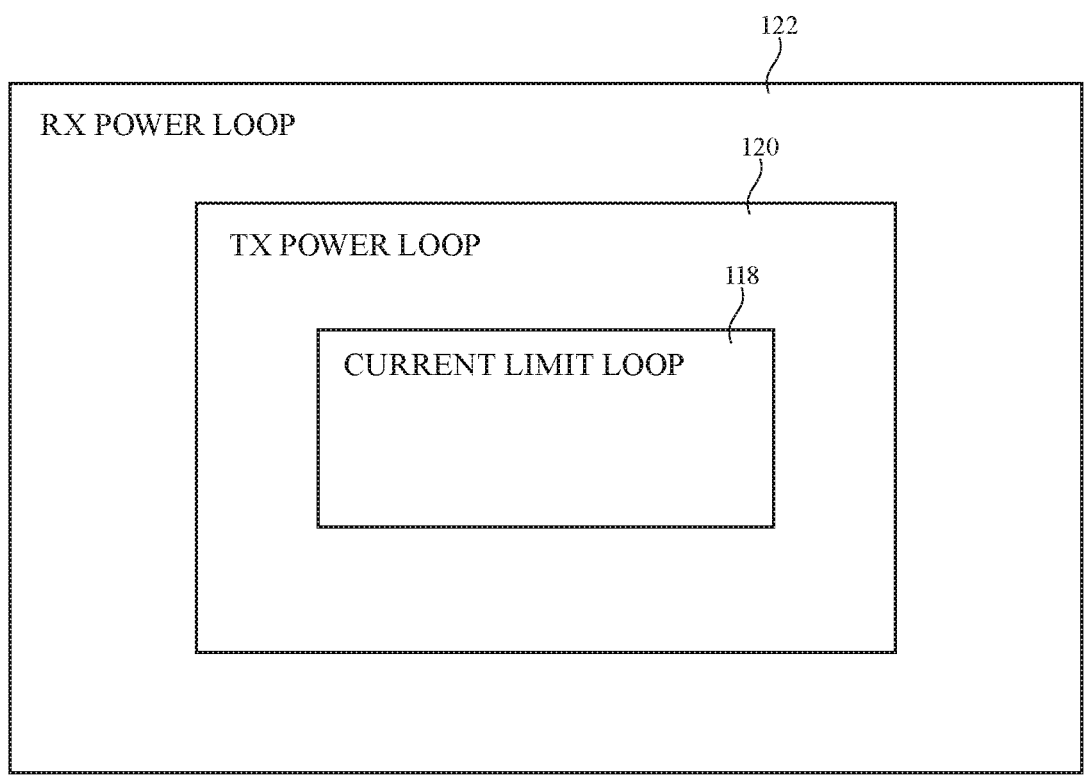
FIG. 10 is a diagram of illustrative operations involved in using a wireless charging system in accordance with an embodiment.

FIG. 10 shows illustrative control loops that may be implemented in system 8 to perform these operations.

During the operation of current limit loop 118, controller 94 may direct integrated circuit 92 to dither current I (e.g., by adjusting him up and down about its present operating point). As current I is dithered, power P (e.g., $I*V$) may be measured and monitored for a peak power. Current I and voltage V (and P) may be measured using measurement circuitry 43 (e.g., current and voltage sensors in wireless power receiver circuitry such as integrated circuits 90 and/or 92). The operating current setting (e.g., the value of current I) may be updated to the current associated with the identified peak power operating point. To ensure that the identified peak power operating point is valid (e.g., to confirm that a peak power has been satisfactorily reached), controller 94 may check to determine whether dithering operations are being performed satisfactorily without failing. Dithering operations can take place at any suitable frequency (e.g., 5 Hz). If desired, other operational settings may be dithered instead of or in addition to dithering current I. For example, the duty cycle of field-effect transistors in the regulator circuitry of integrated circuit 92 may be adjusted to dither the load imposed by integrated circuit 92 (and/or I and/or V).

During the operations of transmit power loop 120, wireless power level adjustment requests are periodically sent to device 12 (e.g., at 0.5 Hz or other suitable frequency), so that a desired target wireless power level Ptarget is maintained. If, for example, control circuitry 30 determines that the level of wireless power being transmitted from device 12 is too low, control circuitry 30 may send an in-band ASK request(s) to device 12 to direct device 12 to increase its wireless power transmission level to Ptarget.

During the operation receiver power control loop 122, device 24 may periodically make adjustments to Ptarget. If as an example, control circuitry 30 determines that wireless power transmitting device 12 has high power capabilities, control circuitry 30 may request that device 12 transmit 7.5 W of power to device 24 (e.g., Ptarget may be set to 7.5 W). As another example, during camera operations with a camera in input-output devices 56, there may be a potential for wireless power interference with wireless power signals transmitted from device 12, so control circuitry 30 can direct wireless power transmitting device 12 to reduce the power level of the wireless power signals transmitted to device 24 (e.g., Ptarget may be set to 1 W). The operations of loop 122 may be performed at any suitable frequency (e.g., 0.5 Hz, less than 0.5 Hz, or more than 0.5 Hz).

The foregoing is merely illustrative and various modifications can be made to the described embodiments. The foregoing embodiments may be implemented individually or in any combination.

What is claimed is:

1. A wireless power receiving device configured to receive wireless power signals transmitted from a wireless power transmitting device at a wireless power transmission level, comprising:
   wireless power receiving circuitry having a wireless power receiving coil, a rectifier coupled to the wireless power receiving coil, and regulator circuitry receiving a current and voltage from the rectifier, wherein a product of the current and voltage corresponds to a power; and
   control circuitry configured to direct the regulator circuitry to adjust the current while monitoring for a peak in the power.

2. The wireless power receiving device of claim 1 wherein the control circuitry is configured to:
   upon determining that the regulator has not adjusted the current as requested, send a request to the wireless power transmitting device to decrease the wireless power transmission level.

3. The wireless power receiving device of claim 1 wherein the control circuitry is configured to operate the regulator circuitry at an operating point associated with the peak in the power.

4. The wireless power receiving device of claim 1 wherein the control circuitry is further configured to:
   periodically adjust a target power value for the power;
   compare the power to the target power value; and
   send corresponding requests to the wireless power transmitting device that cause the wireless power transmitting device to adjust the wireless power transmission level to maintain the power at the target power value.

5. The wireless power receiving device of claim 1 further comprising:
   measurement circuitry configured to measure the current and voltage.

6. The wireless power receiving device of claim 1 wherein the control circuitry includes a controller integrated circuit coupled to the regulator circuitry.

7. The wireless power receiving device of claim 6 wherein the regulator circuitry comprises a direct-current-to-direct-current power converter integrated circuit and wherein the rectifier forms part of a rectifier integrated circuit.

8. The wireless power receiving device of claim 1 wherein the regulator circuitry comprises a direct-current-to-direct-current power converter integrated circuit, the wireless power receiving device further comprising a battery configured to receive power from the direct-current-to-direct-current power converter integrated circuit.

9. A wireless power receiving device, comprising:
   a coil;
   a rectifier that receive wireless power signals using the coil and produces a corresponding output characterized by a current and voltage;
   a regulator circuit that receives the output; and
   control circuitry configured to identify a peak in a power value determined from a product of the current and the voltage by controlling the regulator circuit to adjust the output while the rectifier and coil receive the wireless power signals.

10. The wireless power receiving circuit of claim 9 wherein the control circuitry is further configured to send wireless power transmission level adjustment requests to a wireless power transmitting device.

11. The wireless power receiving circuit of claim 10 wherein the control circuitry is further configured to send the wireless power transmission level adjustment requests using in-band amplitude-shift-keying communications.

12. The wireless power receiving circuit of claim 11 wherein the control circuitry is configured to identify the peak by controlling the regulator circuit to dither the current while the rectifier receives the wireless power signals.

13. The wireless power receiving circuit of claim 12 wherein the control circuitry is configured to send a request to the wireless power transmitting device to decrease a wireless power transmission level upon determining that dithering of the current has failed.

14. The wireless power receiving device of claim 13 wherein the control circuitry is configured to operate the regulator circuitry at an operating point associated with the peak in the power upon determining that the dithering of the current has not failed.

15. The wireless power receiving device of claim 14 wherein the control circuitry is further configured to:
   periodically adjust a target power value for the power value; and
   send requests to the wireless power transmitting device that cause the wireless power transmitting device to adjust the wireless power transmission level to maintain the power value at the target power value.

16. The wireless power receiving device of claim 9 further comprising a battery configured to receive power from the regulator circuit.

17. The wireless power receiving device of claim 16 wherein the regulator circuit comprises a direct-current-to-direct-current power converter integrated circuit.

18. A wireless power receiving device configured to receive wireless power signals transmitted from a wireless power transmitting device, comprising:
   wireless power receiving circuitry having a wireless power receiving coil, a rectifier coupled to the wireless power receiving coil, and a direct-current-to-direct-current power regulator integrated circuit receiving an output from the rectifier, wherein the output is characterized by a current, a voltage, and a power equal to a product of the current and the voltage; and
   control circuitry configured to direct the direct-current-to-direct-current power regulator integrated circuit to adjust the current up and down while monitoring for a peak in the power.

19. The wireless power receiving device of claim 18 wherein the wireless power transmitting device is configured to transmit the wireless power signals at a wireless power transmission level and wherein the control circuitry is configured to:
   send a request to the wireless power transmitting device to decrease the wireless power transmission level upon determining that the direct-current-to-direct-current power regulator integrated circuit failed to adjust the current up and down as directed by the control circuitry.

20. The wireless power receiving device of claim 19 wherein the control circuitry is configured to:
   operate the direct-current-to-direct-current power regulator integrated circuit at an operating point associated with the peak in the power when the direct-current-to-direct-current power regulator integrated circuit adjusts the current up and down as directed by the control circuitry.

\* \* \* \* \*